(12) United States Patent
Wessels et al.

(10) Patent No.: US 11,149,606 B2
(45) Date of Patent: Oct. 19, 2021

(54) EXHAUST SYSTEM OF AN INTERNAL COMBUSTION ENGINE

(71) Applicants: Dr. Ing. h.c. F. Porsche Aktiengesellschaft, Stuttgart (DE); Illinois Tool Works Inc., Glenview, IL (US)

(72) Inventors: Michael Wessels, Bietigheim-Bissingen (DE); Ingo de Wilde, Kortgene (NL)

(73) Assignees: Dr. Ing. h.c. F. Porsche Aktiengesellschaft, Stuttgart (DE); Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/442,605

(22) Filed: Jun. 17, 2019

(65) Prior Publication Data
US 2019/0383182 A1    Dec. 19, 2019

(30) Foreign Application Priority Data

Jun. 15, 2018    (DE) .................... 10 2018 114 337.0

(51) Int. Cl.
*F01N 3/035* (2006.01)
*F01N 3/10* (2006.01)
(Continued)

(52) U.S. Cl.
CPC ......... *F01N 3/035* (2013.01); *B01D 46/0027* (2013.01); *B01D 53/94* (2013.01); *F01N 3/10* (2013.01); *B01D 2279/30* (2013.01)

(58) Field of Classification Search
CPC ....... F01N 3/10; F01N 3/035; B01D 46/0027; B01D 53/94; B01D 2279/30
(Continued)

(56) References Cited

U.S. PATENT DOCUMENTS 4,003,979 A * 1/1977 Kanno ................... A62B 21/00
                                                    423/239.1
4,510,265 A * 4/1985 Hartwig ............... B01D 53/944
                                                    423/215.5
(Continued)

FOREIGN PATENT DOCUMENTS

DE    10 2009 049 624    4/2011
DE    10 2016 103 735    9/2017
(Continued)

OTHER PUBLICATIONS

German Office Action dated Apr. 17, 2019.
Japanese Notification of Reason for Rejection dated Aug. 4, 2020.

*Primary Examiner* — Tom P Duong
(74) *Attorney, Agent, or Firm* — Gerald E. Hespos; Michael J. Porco; Matthew T. Hespos

(57) ABSTRACT

An exhaust system (1) of an internal combustion engine, prior to a first heating-up of the exhaust system (1), has a particle filter (2) and an exhaust line (3) upstream of the particle filter (2). The exhaust system (1) has a carrier element (11) with ash-forming components or ash applied thereto. The carrier element (11) may be on a side of the particle filter (2) facing toward the exhaust line (3). Alternatively, the exhaust system (1) may have a catalytic converter (4) upstream of the particle filter (2), the carrier element (11) that with the ash-forming components or the ash may be applied to the catalytic converter (4).

12 Claims, 1 Drawing Sheet

(51) Int. Cl.
*B01D 53/94* (2006.01)
*B01D 46/00* (2006.01)

(58) Field of Classification Search
USPC .................................... 422/169, 177, 180
See application file for complete search history.

(56) References Cited

U.S. PATENT DOCUMENTS

| | | | |
|---|---|---|---|
| 8,147,762 B2* | 4/2012 | Doring | F01N 3/0222 422/173 |
| 2006/0068159 A1* | 3/2006 | Komori | F01N 3/0222 428/116 |
| 2007/0186911 A1* | 8/2007 | Gerlach | B01D 39/2082 123/556 |
| 2008/0145531 A1* | 6/2008 | Rosynsky | B05D 3/042 427/231 |
| 2008/0241010 A1* | 10/2008 | Ohno | B01D 46/2429 422/180 |
| 2011/0271658 A1* | 11/2011 | Hoyer | B01D 53/9422 60/274 |

FOREIGN PATENT DOCUMENTS

| | | |
|---|---|---|
| JP | 2004-150330 | 5/2004 |
| JP | 2011-169155 | 9/2011 |
| WO | 2014/183998 | 11/2014 |
| WO | 2017/201171 | 11/2017 |

* cited by examiner

EXHAUST SYSTEM OF AN INTERNAL COMBUSTION ENGINE

BACKGROUND

Field of the Invention

The invention relates to an exhaust system of an internal combustion engine in the state prior to the first heating-up of the exhaust system, having a particle filter and having an exhaust line upstream of the particle filter.

Related Art

Exhaust systems with particle filters are well known from motor vehicles used in practice. The exhaust systems generally also have a catalytic converter for the treatment of the exhaust gas. The catalytic converter is arranged upstream or downstream of the particle filter.

Ongoing legal requirements for consumption reduction and simultaneous increasing stringency of particle limit values (mass and number) represents an ever greater challenge in the development of internal combustion engines. The compliance with future particle limit values under the demanded boundary conditions will oppose consumption reduction efforts. Thus, almost all internal combustion engines in the future will require a particle filter, as is already the case with diesel engines.

The particle filter separates the soot produced during combustion and converts that soot into gaseous constituents again by targeted regeneration of the filter. Furthermore, ash constituents that originate in the engine oil and/or in oil additives remain permanently in the filter. The soot loading of the filter currently is acquired by means of back-pressure measurement and redundantly by means of a calculation module. Active measures for soot regeneration are initiated in a manner dependent on the soot fill level. The back-pressure measurement ($\Delta p = f(\text{soot loading})$) however exhibits intense hysteresis, for which reason there is no clear assignment of the loading of the particle filter with soot to the back pressure. The calculation-model-based regeneration is, owing to the intense fuel influence, normally far too early, in particular because the particle number/mass can vary by a factor of 5 between the fuels. It must be the aim to reduce the hysteresis of the back pressure to obtain a clear control variable for the regeneration of the particle filter. At the same time, in a case without hysteresis characteristics, it is also possible to ensure more stable component protection, because specifically highly loaded edge zones can be better acquired by means of back-pressure measurement.

Modern particle filters have two filter functions, namely depth filtration and surface filtration. The deposition of soot leads, in the first step, to depth filtrations with a large pressure increase and, in the second step, to surface filtration with a relatively small pressure increase.

In the case of the depth filtration, the separation of the particles takes place in the wall of the particle filter. In the case of surface filtration, the filtration takes place on the surface of the filter. Over the service life, the particle filter turns increasingly from a depth filter into a surface filter. The depth filtration is associated with a large pressure increase because, in this case, the permeability of the exhaust gas is influenced adversely. If the caverns in the wall have been substantially occupied with soot, then the soot subsequently accumulates predominantly on the wall. This surface filtration leads to a moderate pressure increase, less than in the case of depth filtration. If the soot in the filter is regenerated, then the pressure is depleted with a hysteresis characteristic, that is to say with a large pressure drop in the first step and subsequently with a moderate pressure drop.

By contrast to soot, the ash accumulates in the particle filter always on the wall and not in the wall. In this way, the depth filtration of the soot is fundamentally and irreversibly suppressed, such that the soot cannot penetrate through the ash layer. For the pressure increase with increasing soot deposition, this means that, over the entire range, there is a linear relationship without hysteresis. The quality of the determination of the soot loading by means of a back-pressure measurement thus is improved significantly so that soot regeneration strategies can be controlled in a more targeted and consumption-optimized manner.

To solve this problem described above, it would be necessary for an ash layer to be applied in targeted fashion as a filter cake to the surface of the channel walls of the particle filter in the new state.

WO 2014/183998 A1 has disclosed a method for determining soot loadings of a particle filter in gasoline engines. The determination of the introduced soot loading comprises taking into consideration predetermined soot components of soot-relevant events of a standardized driving cycle.

It is an object of the invention to further develop a structurally simple exhaust system of the type mentioned in the introduction such that an ash layer can be applied to the particle filter, in particular as a filter cake to the surface of the channel walls of the particle filter.

SUMMARY

An exhaust system in accordance with an embodiment of the invention has either: a carrier element that has ash-forming components or ash applied to a side of the particle filter facing toward the exhaust line; or the exhaust system furthermore has a catalytic converter arranged upstream of the particle filter, wherein a carrier element has ash-forming components or ash applied to the catalytic converter.

When the carrier element has the ash-forming components or ash applied to the particle filter or the catalytic converter, the carrier element burns upon the first heating-up of the exhaust system, with a release of the ash-forming components or of the ash and the deposition thereof on the particle filter. The carrier element may be made of any material that can burn under the boundary conditions that prevail in an exhaust system. The only condition is that it must have the ash-forming components or ash, and these are released, and carried by the exhaust-gas flow to the particle filter, during the heating-up of the exhaust system. Here, the position must be upstream of the particle filter.

The carrier element may be applied directly to the particle filter on its side facing toward the exhaust line. Thus, the ash-forming components or the ash, when released, can act only on the particle filter, and no other engine components are affected by it. It is furthermore advantageous that the particle filter attains its full filtration rate after the first full heating-up of the exhaust system.

The carrier element may be composed of paper, cardboard or plastic that has the ash-forming components or the ash. These materials are particularly well-suited to holding the ash-forming components or the ash.

The ash-forming components or the ash layer applied to the particle filter is composed of elements that, during later operation, cannot be removed again as a result of an oxidation or a general dissolution. Furthermore, the ash layer must be introduced only onto the wall and not into the wall. Such elements are for example Ca, Mg, P and Zn with regard to ash-forming components, and MgO, $Al_2O_3$ with regard to ash.

The ash-forming components or the ash are preferably pulverulent.

If the exhaust system has a catalytic converter, the carrier element may be applied to the side of the catalytic converter that faces toward the particle filter or on that side of the catalytic converter that is averted from the particle filter. In each of these arrangements, it is ensured that, when the carrier element burns, the ash-forming components or the ash are released during the first heating-up of the exhaust system, and are deposited on the particle filter.

A particularly simple arrangement of the carrier element on the particle filter or the catalytic converter is possible if the carrier element is bonded adhesively to the particle filter or to the catalytic converter.

The carrier element may be a circular disk in the manner of a wafer. Such a carrier disk can be connected easily to a ring-shaped flange in the inflow region of the particle filter or to a ring-shaped flange in the inflow region or outflow region of the catalytic converter, in particular by adhesive bonding.

The internal combustion engine may be a gasoline engine or a diesel engine. Accordingly, a gasoline particle filter or a diesel particle filter is used.

The exhaust system according to the invention and the refinements thereof comprise various advantages:

- It is thus possible for the ash to be applied exactly to the surface of the particle filter.
- With corresponding equipping of the carrier element with ash-forming components or ash, the ash layer can be set in an exact manner with regard to thickness and composition.
- The depth filtration is suppressed in targeted fashion to enable a clear assignment between back pressure and accumulated soot to be produced.
- The back pressure of the parts remains relatively constant over their service life, and the pressure increase exhibits its linear behavior.
- The filtration rate of modern particle filters increases to the desired value only after a certain service life. The exhaust system makes it possible for the filtration rate to be set very exactly, and reaches the required value already directly after the first heating-up of the exhaust system.
- The particle filter can be designed to be extremely porous and can thus exhibit an extremely low back pressure, because the exhaust system permits exact setting of the filtration rate.

Further features of the invention will emerge from the appended drawing and from the description of embodiments depicted in the drawing, without being restricted to these.

DETAILED DESCRIPTION

Figure 1:
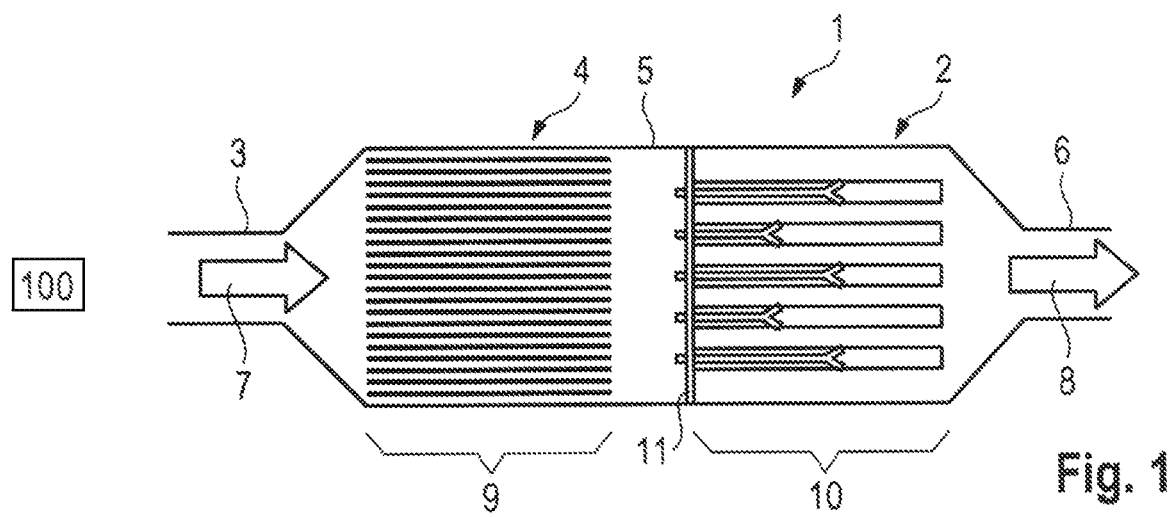
FIG. 1 is a first exemplary embodiment of the invention-relevant region of an exhaust system of an internal combustion engine.

FIG. 1 shows an exhaust system 1 of an internal combustion engine 100, which is a diesel engine or a gasoline engine, in the state prior to the first heating-up of the exhaust system 1. The exhaust system 1 has a particle filter 2 and an exhaust line 3 upstream of the particle filter 2. Directly upstream of the particle filter 2, the exhaust system 1 has a catalytic converter 4—oxidation catalytic converter. The particle filter 2 and the catalytic converter 4 are, in this exemplary embodiment, arranged in a common housing 5. However, a person skilled in the art will understand that the particle filter 2 and the catalytic converter 4 may also be arranged in separate housings. This housing 5 is adjoined upstream by the exhaust line 3 and downstream by an exhaust line 6 that leads away from the particle filter 2. The inflow of the exhaust gas into the catalytic converter 4 is illustrated by the arrow 7, and the outflow of the exhaust gas out of the particle filter 2 is illustrated by the arrow 8. The throughflow length of the catalytic converter 4 is illustrated by the reference designation 9, and the throughflow length of the particle filter 2 is illustrated by the reference designation 10.

A carrier element 11 has ash-forming components or ash applied to the particle filter 2 on its side facing toward the exhaust line 3. The carrier element 11 is composed of paper, cardboard or plastic and is equipped with the ash-forming components or directly with the ash. The ash-forming components are in particular Ca, Mg, P or Zn. The ash is in particular MgO. The ash-forming components or the ash are pulverulent. The carrier element 11 is bonded adhesively to the particle filter 2 in the region of its end side facing toward the catalytic converter 4. The carrier element 11 is a disk and, due to the material composition, exhaust gas flows therethrough during the first heating-up of the exhaust system. An ash layer is applied to the particle filter 2, in particular as a filter cake, to the surface of the channel walls of the particle filter 2.

Figure 2:
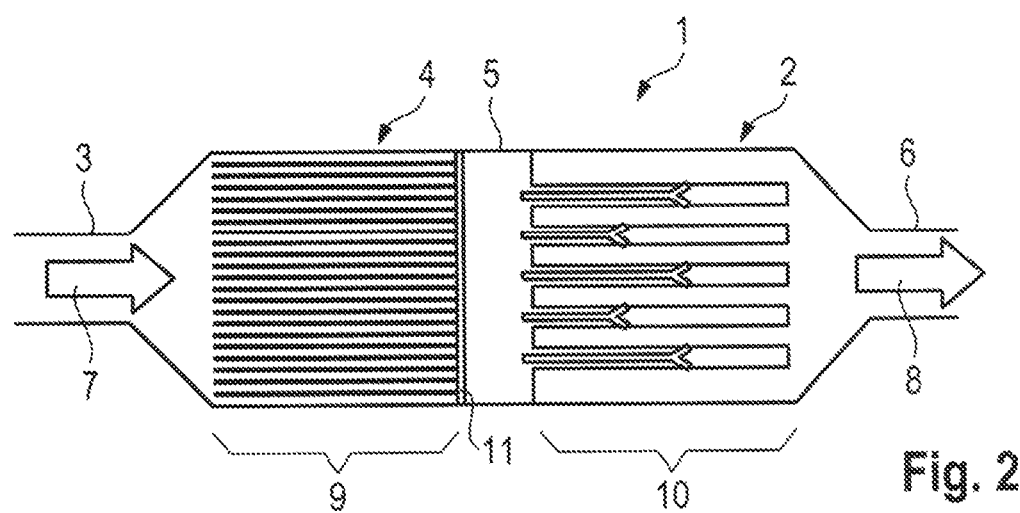
FIG. 2 is a second exemplary embodiment of the invention-relevant region of an exhaust system of an internal combustion engine.

The exemplary embodiment in FIG. 2 corresponds to that in FIG. 1 with the difference that the carrier element 11 that has the ash-forming components or the ash is applied not to the particle filter 2 but to the catalytic converter 4 on its side facing toward the particle filter 2. During the first heating-up of the exhaust system, the exhaust gas flows through the carrier element 11 connected to the catalytic converter 4, and the ash-forming components or the ash are/is released and deposited on the particle filter 2.

Figure 3:
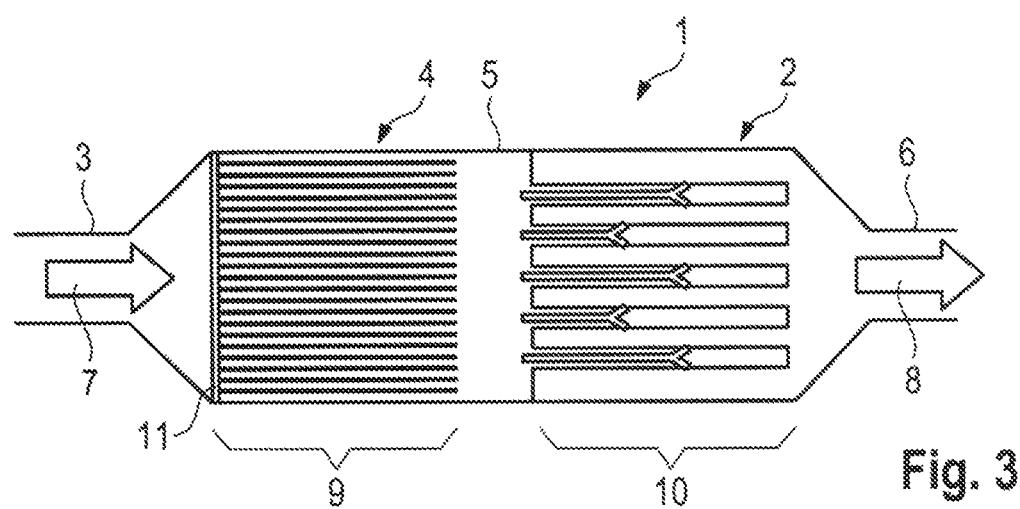
FIG. 3 is a third exemplary embodiment of the invention-relevant region of an exhaust system of an internal combustion engine.

The embodiment in FIG. 3 corresponds to that in FIG. 1 with the difference that the carrier element 11 that has the ash-forming components or the ash is applied not to the particle filter 2 but to the catalytic converter 4 on its side averted from the particle filter 2. During the first heating-up of the exhaust system, the exhaust gas flows through the carrier element 11 connected to the catalytic converter 4, and the ash-forming components or the ash are/is released and deposited on the particle filter 2.

LIST OF REFERENCE DESIGNATIONS

1 Exhaust system
2 Particle filter
3 Exhaust line
4 Catalytic converter
5 Housing
6 Exhaust line
7 Arrow
8 Arrow
9 Throughflow length
10 Throughflow length
11 Carrier element

What is claimed is:

1. An exhaust system of an internal combustion engine in a state prior to a first heating-up of the exhaust system, the exhaust system comprising: an exhaust line carrying a stream of exhaust gas from the internal combustion engine; a particle filter disposed so that the exhaust line is upstream of the particle filter; a catalytic converter arranged upstream of the particle filter; and a carrier element that has pulverulent ash-forming components or ash applied thereto, the carrier element being upstream of the particle filter and being composed of a paper, a cardboard or a plastic that burns under conditions that prevail in the exhaust system so that the carrier element burns upon a first heating-up of the exhaust system and so that the pulverulent ash-forming components or the ash are released and carried by the exhaust gas to the particle filter.

2. The exhaust system of claim 1, wherein the carrier element is applied to a side of the particle filter facing toward the exhaust line.

3. The exhaust system of claim 1, wherein the carrier element that has ash-forming components or ash is applied to the catalytic converter.

4. The exhaust system of claim 3, wherein the carrier element is applied to a side of the catalytic converter that faces toward the particle filter.

5. The exhaust system of claim 3, wherein the carrier element is applied to a side of the catalytic converter that faces away from the particle filter.

6. The exhaust system of claim 1, wherein the ash-forming components comprise at least one of Ca, Mg, P and Zn.

7. The exhaust system of claim 1, wherein the ash comprises at least one of MgO and $Al_2O_3$.

8. The exhaust system of claim 1, wherein the carrier element is bonded adhesively to the particle filter.

9. The exhaust system of claim 1, wherein the catalytic converter and the particle filter are arranged at a distance of at most 20 mm from one another.

10. The exhaust system of claim 1, wherein the internal combustion engine is a gasoline engine or a diesel engine.

11. The exhaust system of claim 1, wherein the carrier element is bonded adhesively to the catalytic converter.

12. An automotive vehicle, comprising: an internal combustion engine; an exhaust line connected to the internal combustion engine and carrying exhaust gas produced by the internal combustion engine; a particle filter disposed so that the exhaust line is upstream of the particle filter; a catalytic converter arranged upstream of the particle filter and a carrier element incorporated into the exhaust line upstream of the particle filter, the carrier element having pulverulent ash-forming components or ash applied thereto; wherein the carrier element is formed from a paper, a cardboard or a plastic that burns under conditions that prevail in the exhaust gas in the exhaust line so that the carrier element burns upon a first operation of the internal combustion engine and so that the pulverulent ash-forming components or the ash are released and carried by the exhaust gas to the particle filter.

\* \* \* \* \*